Oct. 11, 1955 J. E. HOLT 2,720,332

PLASTIC HOLLOW HOUSING CONSTRUCTION

Filed April 4, 1952

2 Sheets-Sheet 1

INVENTOR.

BY John E. Holt

Nathaniel Frucht

ATTORNEY

Oct. 11, 1955 J. E. HOLT 2,720,332

PLASTIC HOLLOW HOUSING CONSTRUCTION

Filed April 4, 1952 2 Sheets-Sheet 2

INVENTOR.
John E. Holt
BY Nathaniel Frucht
ATTORNEY

United States Patent Office 2,720,332
Patented Oct. 11, 1955

2,720,332

PLASTIC HOLLOW HOUSING CONSTRUCTION

John E. Holt, Danielson, Conn., assignor to The Danielson Manufacturing Company, a corporation of Connecticut Application April 4, 1952, Serial No. 280,494
2 Claims. (Cl. 220—4)

The present invention relates to the art of manufacturing hollow plastic articles and has particular reference to a novel construction for a telephone hand-set housing.

The principal object of the invention is to provide a hollow plastic telephone hand-set housing of light weight and very resistant to breakage.

Another object is to provide a simple molding and assembly procedure for a hollow telephone hand-set housing.

Another object of the invention is to provide a telephone hand-set housing which is made of two separately molded parts which readily lock together to form an integral hollow housing.

An additional object of the invention is to provide a telephone hand-set housing formed in two pieces, with novel locking means for securing the two pieces together.

With the above and other objects and advantageous features in view, the invention consists of a novel arrangement of parts more fully described in the detailed description following, in conjunction with the accompanying drawings, and more specifically defined in the claims appended thereto.

It has been found desirable to provide a telephone hand-set housing which is of light weight and which has great resistence to breakage, to withstand rough treatment, for example when used as a field telephone by members of the armed forces. To this end, I have devised a novel construction made of plastic material, and preferably of nylon, whereby the hand-set housing is molded first as two sections formed so that they can be secured together by locking their corresponding mating edges. After the two sections are assembled, the lock parts are permanently sealed together by a suitable sealing compound so that the housing becomes integral.

Figures 1, 2, 3, 4, 5:
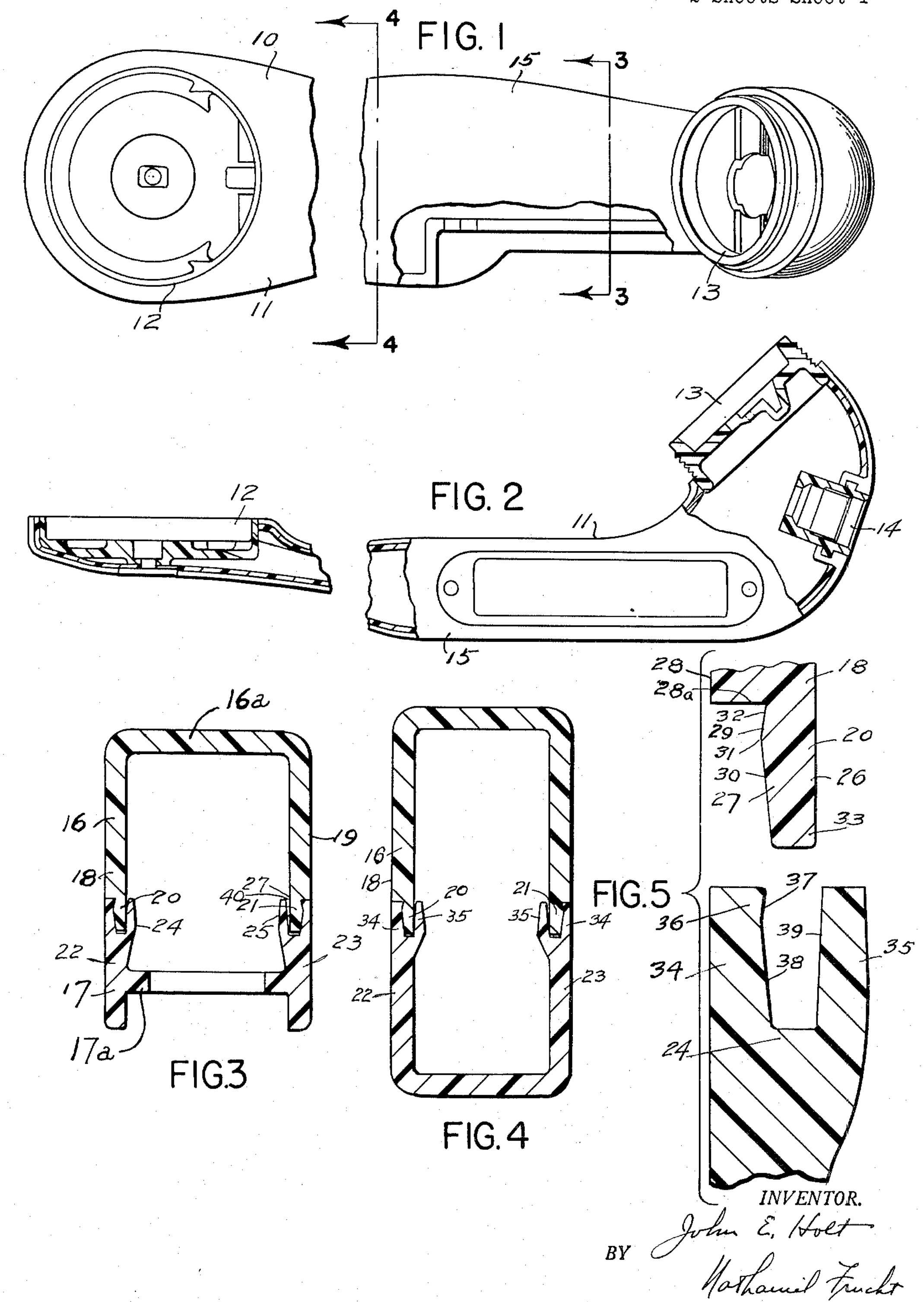
Fig. 1 is a perspective view, partly broken away, of the novel construction of the telephone hand-set housing.
Fig. 2 is a side view of Fig. 1.
Fig. 3 is an enlarged sectional detail on line 3—3 of Fig. 1.
Fig. 4 is an enlarged section view on line 4—4 of Fig. 1.
Fig. 5 is an enlarged sectional view of the corresponding mating edges of the telephone hand-set sections, the parts being in position for locking engagement.

Referring to the drawings, the telephone hand-set housing 10 comprises a hollow elongated body 11 having an opening 12 at one end for mounting an electrical voice impulse transmission element, an opening 13 at the other end for mounting an electrical voice impulse receiving element, and a cord plug opening 14, the intermediate portion being formed as a hand graspable portion 15. The receiving element in the embodiment of Fig. 1 is on a plane generally parallel to and spaced from the plane of the hand graspable element, and the transmission element is on a third plane at about a 45 degree angle to the other two planes.

The housing 10 is longitudinally divided into an upper section 16 and a lower section 17 which are permanently joined as hereinafter described, the sections being generally U-shaped as illustrated. The upper section 16 has a horizontal wall 16*a*, and generally vertical parallel depending walls 18, 19, the walls having depending lock elements 20, 21, and the lower section has a horizontal wall 17*a*, and generally vertical upstanding walls 22, 23, which have their upper edges formed as cooperating grooved lock seats 24, 25. The depending lock elements 20 and 21 each have inner sides 26 which are contiguous extensions of the inside of the walls 18, 19 and outer sides 27 in spaced relation to the inner surfaces 28 of the walls 18, 19 to provide a shoulder 28*a*. The outer sides 27 have upper outwardly slanting portions 29 and lower outwardly slanting portions 30 which meet at an intermediate outwardly bulging apex 31, to provide upper recesses 32 and lower slanted depending portions 33.

The lock seats 24, 25 include an outer jaw 34 and an inner jaw 35, the outer jaw being slightly more massive than the inner jaw, and having an upper tooth 36 having an inclined inner edge 37 to lock seat within the upper recess 32. The lower inner side 38 of the outer jaw 34 slants inwardly to cooperatively engage the outer slanting portion 30 of the depending portion 33 when the lock portion is seated within the lock seat. The inner side 39 of the inner jaw 35 slants outwardly slightly so that a spaced relationship results when the lock portions are seated within the lock seats, this spaced relationship forming a trough 40 for receiving a binding agent to cement the lock portion and the lock seat together.

Figures 6, 7, 8:
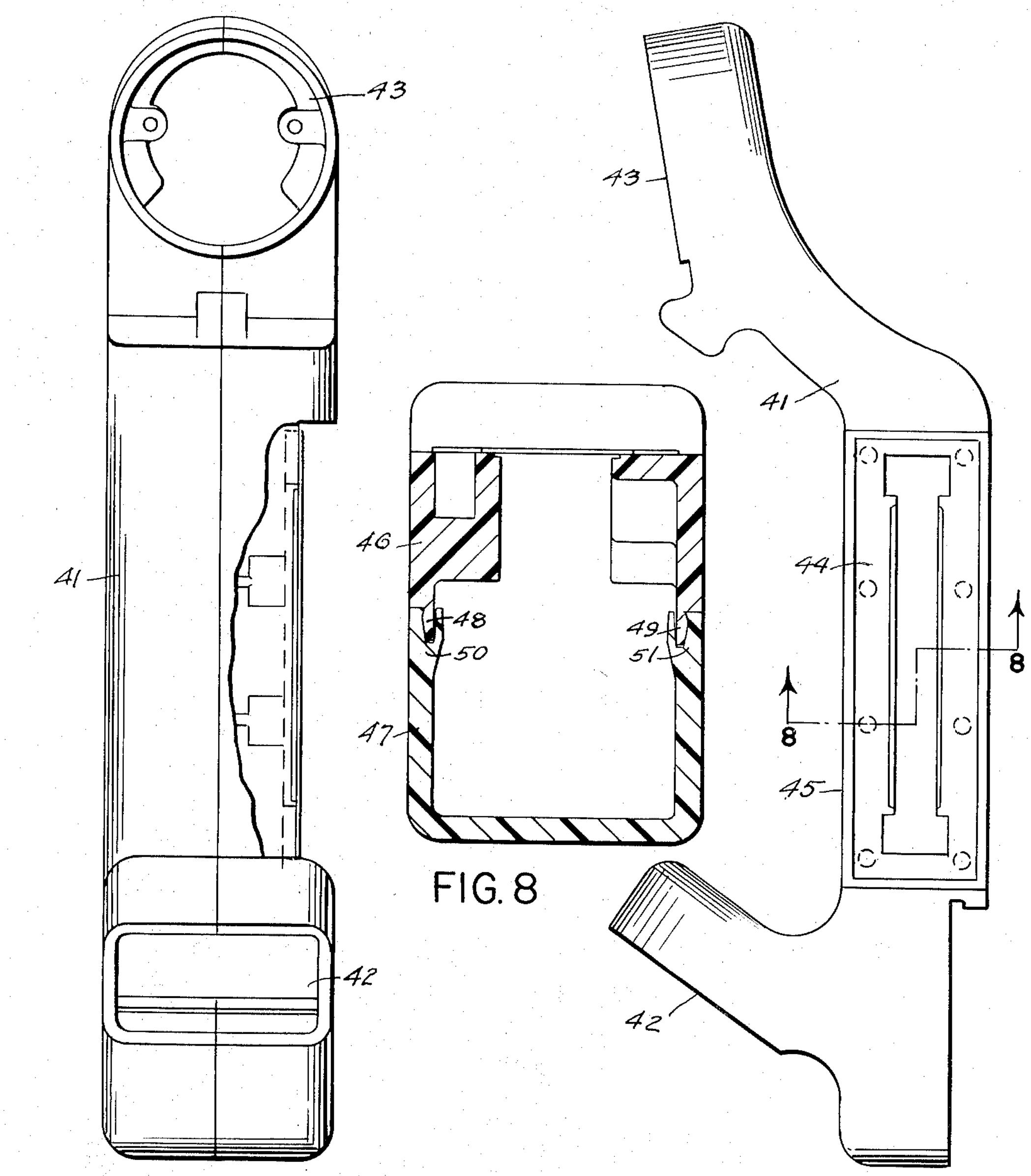
Fig. 6 is a perspective view, partly broken away, of a modified type of telephone hand-set housing.
Fig. 7 is a side view of Fig. 6.
Fig. 8 is an enlarged section on the line 8—8 of Fig. 6.

A modified type of telephone hand-set housing is shown in Fig. 6, having a hollow elongated body 41 with an opening 42 at one end for mounting an electrical voice impulse transmission element, an opening 43 at the other end for mounting an electrical voice impulse receiving element, and an opening 44 for a cord plug and other electrical accessories, the intermediate portion being formed as a hand graspable portion 45. The receiving element, the transmission element and the hand graspable portion are on different planes as illustrated, the receiving element being at an angle of less than 25 degrees to the hand graspable portion, and the transmission element being at an angle of about 45 degrees to the hand graspable portion. The housing is longitudinally divided into upper and lower sections 46, 47, the sections being generally U-shaped as illustrated, and joined together in the same manner as the two sections 16, 17 of Fig. 3, as described above, by lock seating their depending upper wall lock elements 48, 49 within the lock seats 50, 51 of the upstanding lower walls and cementing the two together by a binding agent, the lock elements and the lock seats being shaped as described for the modification of Fig. 1.

It is now clear that the applicant's novel construction provides an integral two-piece telephone hand-set housing made of plastic which can be easily assembled and which can withstand rough treatment outdoors due to impact and weather changes. The novel method of locking the two separate parts of the hand-set housing by means of snap engaging the depending portions of one part with the upstanding portions of the other part and then sealing the parts together by means of a binding agent, preferably resorcinol formaldehyde resin, makes a telephone hand-set housing which can be cheaply molded from plastic material, which, although it has relatively thin walls and is comparatively light weight, is nevertheless very tough. The preferred plastic material is nylon of the type commercially known as 10001, which is extremely tough and sufficiently resilient to provide a snap fit when the parts are shaped as described and illustrated.

Although I have described a specific constructional embodiment of my invention, it is obvious that changes in the size, shape and arrangement of the parts and their materials may be made to meet different hollow housing requirements, without departing from the spirit or the scope of the invention as defined in the appended claims.

I claim:

1. A hollow plastic housing comprising two sections each having a horizontal wall and two vertical parallel walls extending in the same direction from and substantially perpendicular to the horizontal wall, the parallel walls of the two sections having cooperating lock elements at their free edges for connecting the two sections, the lock elements of one section being extensions of the parallel walls and in the planes thereof, the outer surface of each extension having a cut-away portion providing a recess and a bulging portion extending in a direction perpendicular to the plane of its associated parallel wall, the lock elements of the other section each including a longitudinal groove opening perpendicularly away from the horizontal wall of said other section and having a base and two faces providing a lock seat for receiving a cooperating extension of said one section, the inner face of each groove having a projecting portion seating in the recess of the extension and a cut-away portion adapted to receive the extension bulging portion, and the outer face of each groove being inclined away from the base, whereby space for receiving a bonding agent to cement the sections together is provided.

2. A telephone hand-set housing comprising a hollow elongated body including an opening at one end adapted to receive an electrical voice impulse transmission element and a second opening at the other end adapted to receive an electrical voice impulse receiving element, said elongated body consisting of two sections, each having a horizontal wall and two vertical parallel walls extending in the same direction from and substantially perpendicular to the horizontal wall, the parallel walls of the two sections having cooperating lock elements at their free edges for connecting the two sections, the lock elements of one section being extensions of the parallel walls thereof and in the planes thereof, the outer surface of each extension having a cut-away portion providing a recess and a bulging portion extending in a direction perpendicular to the plane of its associated parallel wall, the lock elements of the other section each including a longitudinal groove opening perpendicularly away from the horizontal wall of said other section and having a base and two faces providing a lock seat for receiving a cooperating extension of said one section, the inner face of each groove having a projecting portion seating in the recess of the extension and a cut-away portion adapted to receive the extension bulging portion, and the outer face of each groove being inclined away from the base, whereby space for receiving a bonding agent to cement the sections together is provided.

References Cited in the file of this patent

UNITED STATES PATENTS

| | | |
|---|---|---|
| 2,351,387 | Anderson | June 13, 1944 |
| 2,362,902 | Jansen | Nov. 14, 1944 |
| 2,512,105 | Van Marwijk Kooij et al. | June 20, 1950 |

FOREIGN PATENTS

| | | |
|---|---|---|
| 584,901 | Great Britain | Jan. 24, 1947 |